United States Patent [19]

Christiansson

[11] 4,102,422
[45] Jul. 25, 1978

[54] DEVICE FOR MEASURING LOADS, ESPECIALLY TRANSIENT LOADS

[75] Inventor: Per Lennart Christiansson, Lund, Sweden

[73] Assignee: Telub AB, Sweden

[21] Appl. No.: 674,972

[22] Filed: Apr. 8, 1976

[30] Foreign Application Priority Data

Apr. 8, 1975 [SE] Sweden .................. 7503998

[51] Int. Cl.² ............... G01G 19/02; G01G 3/14
[52] U.S. Cl. .................. 177/210 C; 177/133; 361/283; 361/291
[58] Field of Search ............ 177/210 C, 133; 317/246, 249 R, 261; 340/272, 200; 361/283, 291

[56] References Cited

U.S. PATENT DOCUMENTS

| | | | |
|---|---|---|---|
| 3,565,195 | 2/1971 | Miller | 177/210 C |
| 3,678,378 | 7/1972 | Trott | 317/246 X |
| 3,782,486 | 1/1974 | Kuhn | 177/210 C |
| 3,875,481 | 4/1975 | Miller | 177/210 C X |
| 3,966,002 | 6/1976 | Schneider | 177/210 C |

Primary Examiner—Joseph W. Hartary
Attorney, Agent, or Firm—Burns, Doane, Swecker & Mathis

[57] ABSTRACT

A device comprises for sensing or measuring loads, especially transient loads, such as a load imposed by a wheel of a vehicle driving over the device. The device comprises two electrically conductive plates and an intermediate dielectric and elastomeric or elastic material. In a central plane of the dielectric material a series of threads of steel wire is embedded. Said threads are connected together electrically at one end. At least two spaced capacitor electrodes are constituted by one plate and said threads. The dielectric and elastomeric material is adapted to be engaged by the load and the variation in the capacitance is linearly proportional to the magnitude of the applied load. The two plates are pressed towards each other in order to cause a mechanical preloading of the intermediate material in order to give said linear proportionality.

10 Claims, 14 Drawing Figures

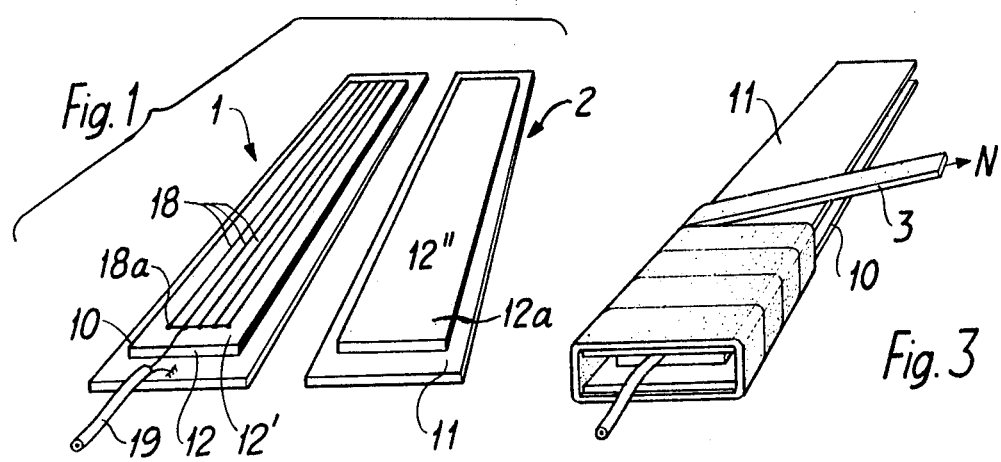
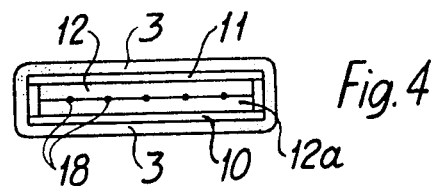
Fig. 3
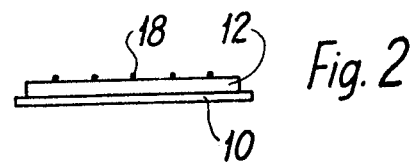
Fig. 2
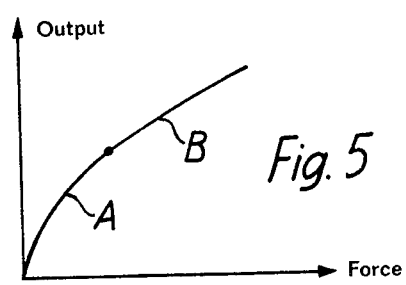
Fig. 5
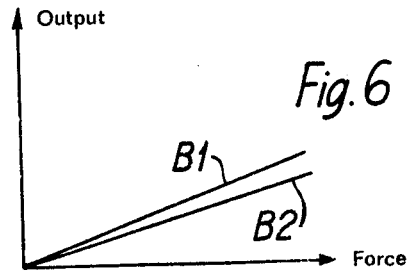
Fig. 6
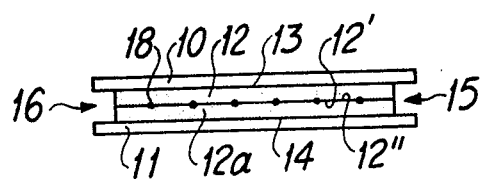
Fig. 7
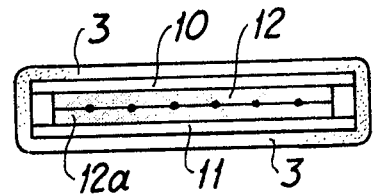
Fig. 8
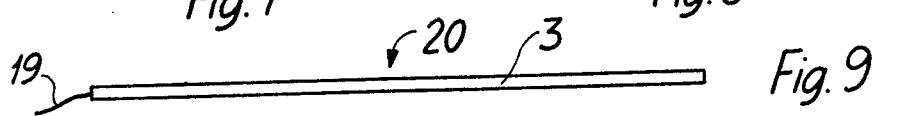
Fig. 9
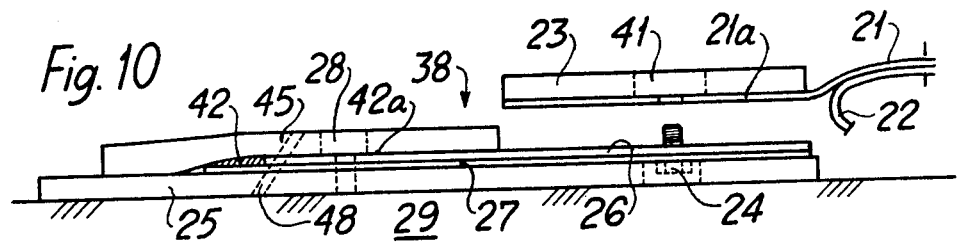
Fig. 10

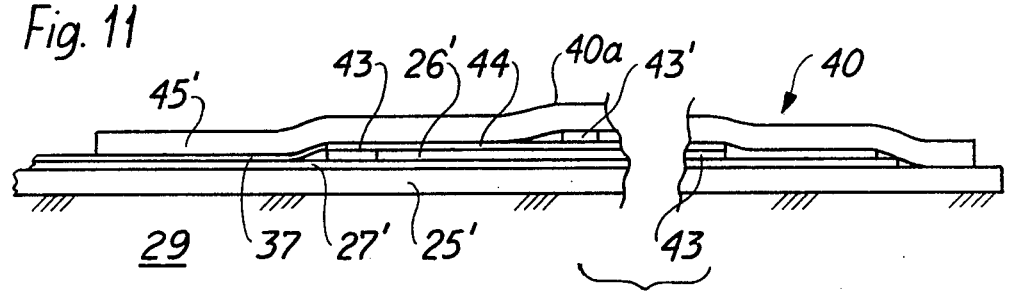
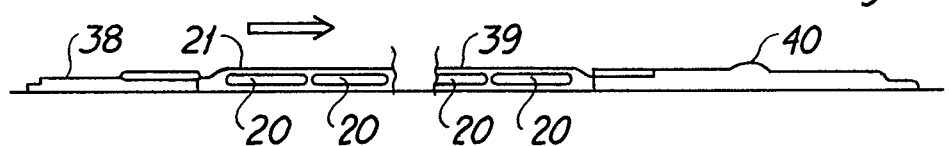
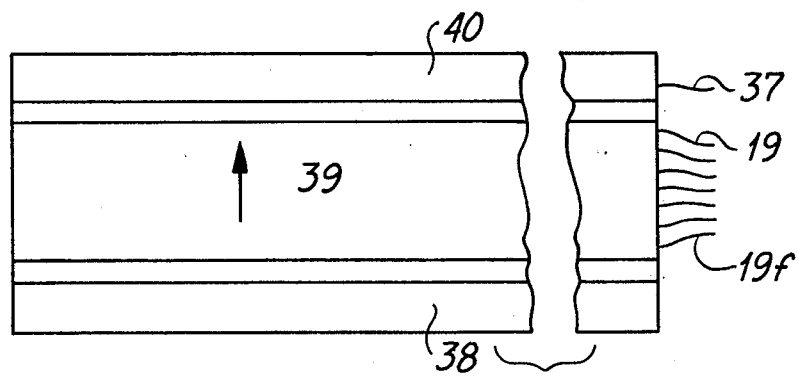
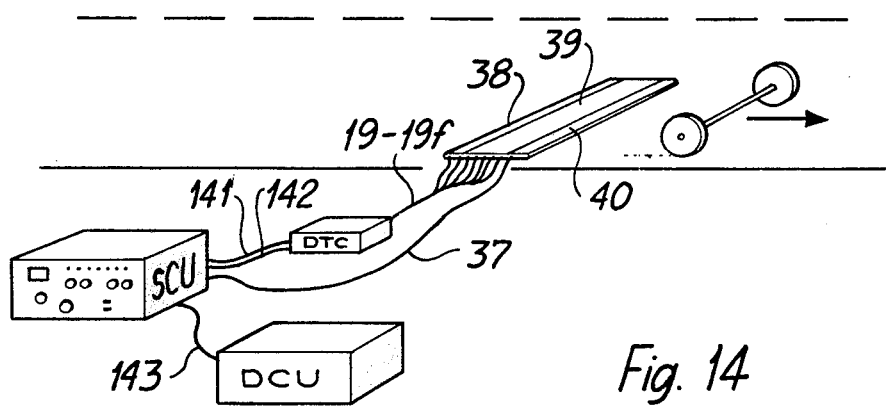

DEVICE FOR MEASURING LOADS, ESPECIALLY TRANSIENT LOADS

FIELD OF THE INVENTION

This invention relates to a device for sensing or measuring loads, especially transient loads. The invention is especially adapted for measuring axle weights of vehicles passing or driving over the device placed on a road surface.

BRIEF DESCRIPTION OF THE PRIOR ART

A previously known device for sensing and measuring a transient load imposed by at least one wheel on an axle of a passing vehicle, comprises a resiliently flexible mat formed of a dielectric, an elastomeric material adapted to be engaged by the wheel, at least two vertically spaced capacitor electrodes embedded in and extending over substantially the entire operative area of the mat, and means for connecting the electrodes to an apparatus for detecting variations in the electrode spacing due to transient loads. Void areas are located in the body of the mat to provide for mat deformation that is linearly propotional to the magnitude of an applied load, said voids ares being uniformly distributed in the mat and extending at least substantially from one of said electrodes to the other.

Other pressure transducers for measuring axle weights have also been previously proposed but most of these require structural adaptation of the road surface. With the development of portable dynamic weight bridges, which included portable or at least mobile laboratories for the instrumentation, of these bridges was found necessary to develop a new pressure tranducer which is easy to construct and can be applied to the road without any structural adaption of the road surface. It has also been found that the pressure transducer must have a linear relation between the applied load and the received electrical information, particularly between the transient load and the variation in capacity.

OBJECTS OF THE PRESENT INVENTION

One object of the present invention is to provide a device for measuring loads, especially transient loads, in which the received result is in a linear relation to the transient load.

Another object is to provide a device which can be applied easily to the road surface without any structural adaption of the road surface. Further, the device must be so constructed that it has a small height, in order to reduce the influence of dynamic forces caused by the vehicles when passing over the device.

Another object is to provide a device which may be inexpensively produced and which is simple to operate.

A further object is to provide such a device having a high resistance to mechanical damage and a low sensitivity to external electrical phenomena.

These and other objects which will be apparent to those skilled in the art are achieved by providing a device having two electrically conductive plates and an intermediate dielectric and elastomeric or elastic material in which the intermediate materials is mechanically pre-loaded by pressing the two plates together in order to produce the aforementioned linear response.

In the device as constructed, the above mentioned pre-loading is acheived by winding a stretched rubber ribbon around said plates. The stress in the rubber ribbon resulting from its being stretched produces the pre-loading of the intermediate material.

One capacitor electrode is formed by embedding a series of steel wires in a central plane of the dielectric material; the aforementioned two plates together serving as the second capacitor. The latter may be connected to zero or ground potential.

BRIEF OF DESCRIPTION OF THE DRAWINGS

In order to fully describe and illustrate the invention, an example is set forth below reference being made to the accompanying drawing in which FIG. 1 is a perspective view of the unassembled device, FIG. 2 is a sectional view of one part of FIG. 1, FIG. 3 is a perspective view of the device when the latter is being subjected to pre-loading by winding a stretched rubber ribbon around the two plates which form a part of said device.

FIG. 4 is a sectional view of the device shown in FIG. 3,

FIG. 5 is an output signal to force diagram of the device shown in FIG. 7 in which the dielectric is not pre-loaded, FIG. 6 is an output signal to force diagram of the device shown in FIG. 8 having a pre-load of approximately 3kp/cm$^2$, FIG. 7 is a front elevation of an assembled device without pre-loading with six threads of steel wire material, FIG. 8 is a sectional view of the device shown in FIG. 7 but which is subjected to pre-loading.

FIG. 9 is a plan elevation view of the complete device on a reduced scale,

FIG. 10 is a side elevation of a drive used by a vehicle to move up to a weighing station using devices according to the present invention, FIG. 11 is a side elevation of a drive used by a vehicle to move from the weighing station, FIG. 12 is a side elevation of a weighing station including the drives shown in FIGS. 10 and 11, FIG. 13 is a plan view of the weighing station according to FIG. 12 and in which seven devices are used and, FIG. 14 is a perspective view of an application of the weighing station using electronic devices to evaluate the output signals emitted by the devices and other means.

DESCRIPTION OF THE PREFERRED EMBODIMENT

The device according to the present invention is shown in perspective and in a nonassembled state. The device comprises two parts, a first part 1 and a second part 2. Part 1 consists of an electrically conductive plate 10 and a dielectric and elastomeric or elastic sheet material 12. Part 2 consists of an electrically conductive plate 11 and a dielectric and elstomeric or elastic sheet material 12a. Onto the material 12 is applied a number of threads 18. In FIG. 1 five threads are shown but in FIG. 7 six threads are shown. The number chosen depends on the intended use and the material employed in other parts of the device.

In FIG. 2 part 1 shown in front elevation.

It is a principal object of the present invention that the two conductive plates 10 and 11 be pressed (prepressed) toward each other to cause pre-loading in the intermediate dielectric and elastomeric or elastic material. This is done, as shown in FIG. 3, by the use of a rubber ribbon 3. This ribbon is wounded as a spiral around the plates 10 and 11 while being stretched in the direction indicated by "N" in FIG. 3. It is suggested that the stress in the ribbon should be so adjusted that the preloading has the magnitude of approximately 3kp/cm².

FIG. 4 is a front elevation in section of the completed device shown in FIG. 3.

Because the molecular composition of rubber, the relation between received output signal and applied force well known. FIG. 5 is shows the characteristic diagram. This diagram starts with an non-linear portion "A", followed by a linear portion "B". If the material used has the demension and the characteristics mentioned hereinafter it has been found that the value where the non-linear portion "A" changes to linear portion "B" is about 3kp/cm².

If the plates 10 and 11 are pressed toward each other, as indicated in FIG. 3 and 4 under a pre-load of 3kp/cm² the output signal is linear with the applied force or load. This is illustrated in FIG. 6 by the line "B1". If the device is subject to a number of loads, espceially high transient loads, it has been found that the line may acquire a smaller inclination as illustrated by line "B2".

Referring to FIG. 7, there is shown a device in a non pre-loaded state, The upper conductive plate 10 and the lower conductive plate 11 are arranged on each side of an intermediate dielectric homogeneous material 12 and 12a. The material 12 or 12a consists, in this application, of crude rubber sheets having a thickness of 2 mm, a shore hardness of 40° and a modulus or rigidity G=3.5kp/cm². (Shear modulus). The conductive plate has a thickness of 1.5 mm.

The sheet material 12 is rigidly bonded by its upper surface 2 the under surface of the plate 10, the bond being indicated by reference numeral 13. The sheet material 12a is rigidly fixed onto the upper surface of the plate 11 and the bond has the reference numeral 14. Any conventional glue, such as cyanic acrylic glue, may be used to get a rigid bond.

The sheet material 12 and 12a have essentially identical cross-section and are arranged to cooperate with each other. Before the surfaces 12' and 12" are glued together a number of threads of steel wire are applied to the surface 12'. These steel wires may be music wires having a diameter of 0.25 mm. One end portion of each wire is welded or soldered to a connecting wire 18a. Connecting wire 18a is connected to the central conductor in a coaxial cable 19. The glue used to bond the surface 12' and 12" together may be any conventional, as seen in FIG. 7, are wider than and extend beyond.

The plates 10 and 11 extends and pass the side edges 15 and 16 of the material 12, 12a in order to insure a uniform and free deformation of the rubber sheet material 12 and 12a as a result of the pressure caused by the rubber ribbon 3 (FIG. 3) and the load. The plates 10 and 11 have the same length as the materials 12 and 12a.

The bonded surfaces 12' and 12" are located in a central plane of the device and the wires 18 are each oriented in side-by-side relation spaced equidistant apart.

The central conductor of the coaxial cable 19 is connected to the wires 18 and the shield conductor, which is at earth potential, is connected to the plates 10 and 11. By sensing the variation in the capacitance depending upon the load (transient load) it is possible to receive an output signal.

In FIG. 8 is a sectional view of the device as shown in FIG. 7, but here the device is subjected to pre-loading has previously mentioned.

One device of the construction illustrated above is shown in a plan view in FIG. 9 and has been given the reference numeral 20. It is to be noted that FIG. 9 is shown in reduced scale.

Before the device or a number of devices are described in an preferred embodiment in the form of a weighing station, a more detailed explanation will be presented of how the deformation changes the capacity. The explanation is based upon the embodiment shown in FIGSS. 7, 8 and 9.

The wires 18 between the rubber sheets 12 and 12a do not affect the deformation. The formula used for determining deformation is the same as the formula used for rubber bearings. If it is assumed that the active surface of the load has a length essentially exceeding its breadth (strip form), than the deformation will follow the formula $$\delta = (p \cdot t^3)/(G \cdot b^2)$$

in which
  $\delta$ = deformation
  $p$ = force/unit of surface
  $t$ = the toatal thickness of the strip
  $G$ = modules of rigidity
  $b$ = the breadth of the strip.

As mentioned the threads 18 do not cause any resistance towards horisontal deformation in a direction perpendicular to the longitudinal direction of the strip. A larger deformation is therefor caused than would be the case if a metal sheet has been used instead of wires. In this application the relative deformation exceeds the deformation obtainable by a metal sheet by a factor of four. It is obvious from the formula that said deformation is changing by a second power calculated on the thickness of the sheet. As a flexible glue is used between the rubber strips 12 and 12a no shearing strain occurs in this bond.

From the above formula it can be shown that the deformation is linear with reference to the applied force or load.

Assuming, by way of illustration, that $b=35$ mm, $t=4$ mm, $1=2000$ mm (the lenght of the strip) and $G=3,5$ kp/cm², a relative change of volume between the plates 10 and 11 will be (using cm and kp) Mp, $$\delta/t = (p \cdot t^2 \cdot 1000)/(G \cdot b^2 \cdot p \cdot 1 \cdot b) = 0.53\%/\text{Mp}.$$

It is obvious that the electrical construction of the device can be seen as two capacitors having a common electrode (the wires 18). Due to the fact that the plates 10 and 11 surround the wires and the strips, the sensitivitly to external current is practically eliminated.

The capacitance for each capacitor may be calculated from the equation

C = (dielectric constant for rubber) (area)/ $\pi \cdot 4$ . (distance between the plates).

If the dielectric constant for the rubber which is used is 2,9 and the threads has the breadth $6 \cdot 0.55\text{cm} = 3.3$ cm then the average breadth of the plate is $(3.3 + 4.0)/2 = 3.65$ cm and the capacitance is 1680pF.

It has been necessary to reduce the capacitance if wires are used instead of a plate (edge effect). Increasing the distance between the threads causes a further reduction of the capacitance. Measurements have shown that the device has a capacitance of about 800 pF.

For small deformations the change in capacitance is a linear function of the deformation (compression). The total change in capacitance is linear to the change in volume. Thus for each device $$800 \cdot 0.53/100 = 4 pF/Mp.$$

Tests have shown that it is possible to detect change in force as low as 20kp, which means a change in the capacitance of 0.08pF.

In FIG. 10-14 there is shown a complete portable weight bridge having a portable weighing station. The weighing station comprises a first drive, the weighing station and a second drive.

The first drive will be described with reference to FIG. 10. FIG. 10 is a side elevation of a drive used by a vehicle in order to move up to the weighing station. The weighing station has been given the reference numeral 39, the first drive 38, and the second drive 40. (FIG. 12).

The weighing station comprises a number of devices 20, each and every device be covered by a plate 21. Plate 21 cooperates with a rubber sheet 22 applied by glue to the under surface of said plate 21.

Plate 21 is glued to a part 23, made of rubber, which is placed to cooperate with the upper end surface 21a of the plate.

The drive 38 comprises a plate 27 which is glued to a rubber portion 25 and a rubber sheet 26. The end surface 21a is secured to the plate 27 by a screw 24, which cooperates with plate 27. This is done by placing a nut (not shown) in a recess 41 in the part 23.

Plate 27 and rubber sheet 26 extended from part 23 and cooperate with a drive section 45, made of rubber. Section 45 is glued to plate 27 in the region 42 and to the sheet 26 in the region 42a.

When device 20 and part 23 are secured to drive 38, said drive 38 is secured to the support 29 by means of screws or nails oriented into recesses 28 and intended to withstand horizontal forces. Further recesses or holes 48 are extend in a plane parallel to the devices 20 and inclined towards the support 29, and are intended to receive nails or screws which should withstand vertical forces. This drive has a length equal to the devices 20. The dimensions of the parts forming the drive may be as follows.

Rubber sheet 26 (1 mm), plate 27 (1 mm), rubber sheets 45, 23 and 25 (4 mm). This gives a total height of 11 mm. The plate 21 and the rubber sheet 22 may have a thickness of 1 mm.

FIG. 11 shows a side elevation of a drive 40 used by a vehicle to move from the weighing station. This drive 40 is identical to the drive 38 and the same parts have been given the same reference numerals, adding a prime mark. This drive has a rubber sheet 25', a metal plate 27' and a rubber sheet 26'. The part to the right and the part to the left in FIG. 11 are identical to the drive already described.

In the intermadiate portion 40a of the drive 40 a side indication device is arranged. This device comprises rubber strips 43 oriented perpendicular to the direction of the drive. These strips are placed between the plate 27' and the rubber sheet 45' and metallic strips 44 oriented in the drive direction. Only one strip 44, is shown, but it is assumed that a plurality of strips 44 are oriented adjacent each other.

Each metal strip 44 is connected to and electric output line 37.

The function of the side indication device is as follows. One metal strip 44 among all strips will be pressed, by the load acting upon the rubber sheet 45', by the rubber strip 43' into electrical contact with the metal plate 27', closing an electric circuit. By sensing and treating this signal it is possible to determine where the load was acting.

Due to the fact that the weighing station has seven devices 20 (FIG. 12) and each senses the transient load it will be possible to determine the velocity of the vehicle. The distance between a sensed device 20 and the indication device 43', 44 is known and the time between activation may be evaluated in electronic devices.

In FIG. 12 the arrow indicates the direction of movement of the vehicle.

FIG. 13 is a plan view of the weighing station and associated drives in which the cables 19–19f is shown. Each cable is connected to its device 20. FIG. 13 further shows a cable 37, which cable includes a wire for each strip 44. The length of the devices may be half the breadth of the road or less; but may also be larger.

FIG. 14 shows in a perspective view the use of the weighing station with associated drives using electronic devices in order to evaluate the output signals emitted by the devices and other means.

The electronic devices which are used for treating the signals do not form any part of the present invention but their function will be described.

Each device is fed by square waves having a frequency of 20kHz. A load changes the capacitance in the device and thus the discharging time of said capacitor through a resistance is changed. By evaluating the discharge time it is possible to obtain an analog signal. This signal is amplified and detected in a analog/digital converter.

The recording may be continuous or only based upon the maximum value. With this electronic device it is possible to set a threshold value under which no recording occurs. This makes it possible to distinguish passenger vehicle from lorries. By using the side indication device it is possible, as previously mentioned, to evaluate the velocity of the vehicle. It is also possible to correct and amend the result due to dynamic forces, which may occur.

In FIG. 14 there is shown a DTC-device (discharge to time converter), a SCU-device (signalconditioning and control unit) and DCU-device which is a signal-collecting unit.

Lines 19–19f are connected to the DTC-device in which the signals are treated. The result is fed to the SCU-device via line 141, Lines 142 is a power supply. Cable 37 is connected directly to the SCU-device. A cable 143 is arranged to feed information from the SCU-device to the DCU-device.

While prime importance is given to the device 20 and its use in a weighing station 39 for measuring axle weight of vehicles driving over the station the invention as being used generally for the measuring of various types of forces, transient or static.

It should be noted that the threads or wires may be in the form of strips or in the form of a sheet material.

What is claimed is:

1. A variable capacitance device for sensing and measuring loads, especially transient loads, wherein the capacitance varies as a linear function of the loads to be measured, said device comprising:

(a) two conductive plates,
(b) an elastic dielectric layer between said plates,
(c) means encompassing said device for compressing said two conductive plates toward each other and for maintaining pressure on said conductive plates to preload said dielectric layer to cause the capacitance of the device to vary as a linear function of the loads to be measured,
(d) a plurality of conductive threads embedded in said dielectric layer,
(e) a first electrode of the device connected to said threads, and
(f) a second electrode of the device connected to one of said plates.

2. A device according to claim 1, wherein a stiff bond is applied between the plates and the dielectric layer.

3. A device according to claim 1, wherein the threads are oriented in a central plane of the dielectric layer.

4. A device according to claim 1, wherein the threads are further oriented longitudinally in the layer and are equally spaced.

5. A device according to claim 1, wherein compressing means consists of a stretched elastic strip.

6. A device according to claim 1, wherein the breadth of the plates exceeds that of the dielectric layer.

7. A device according to claim 1, wherein the dielectric layer consists of two parts.

8. A device according to claim 7, wherein the two parts are bonded to each other by a flexible bond.

9. A weighing station including a plurality of the devices of claim 1, wherein each device rests upon a road surface and a drive is arranged on both sides of the devices.

10. A weighing station according to claim 9, wherein a plate is covers the devices.

* * * * *